Patented Feb. 25, 1930

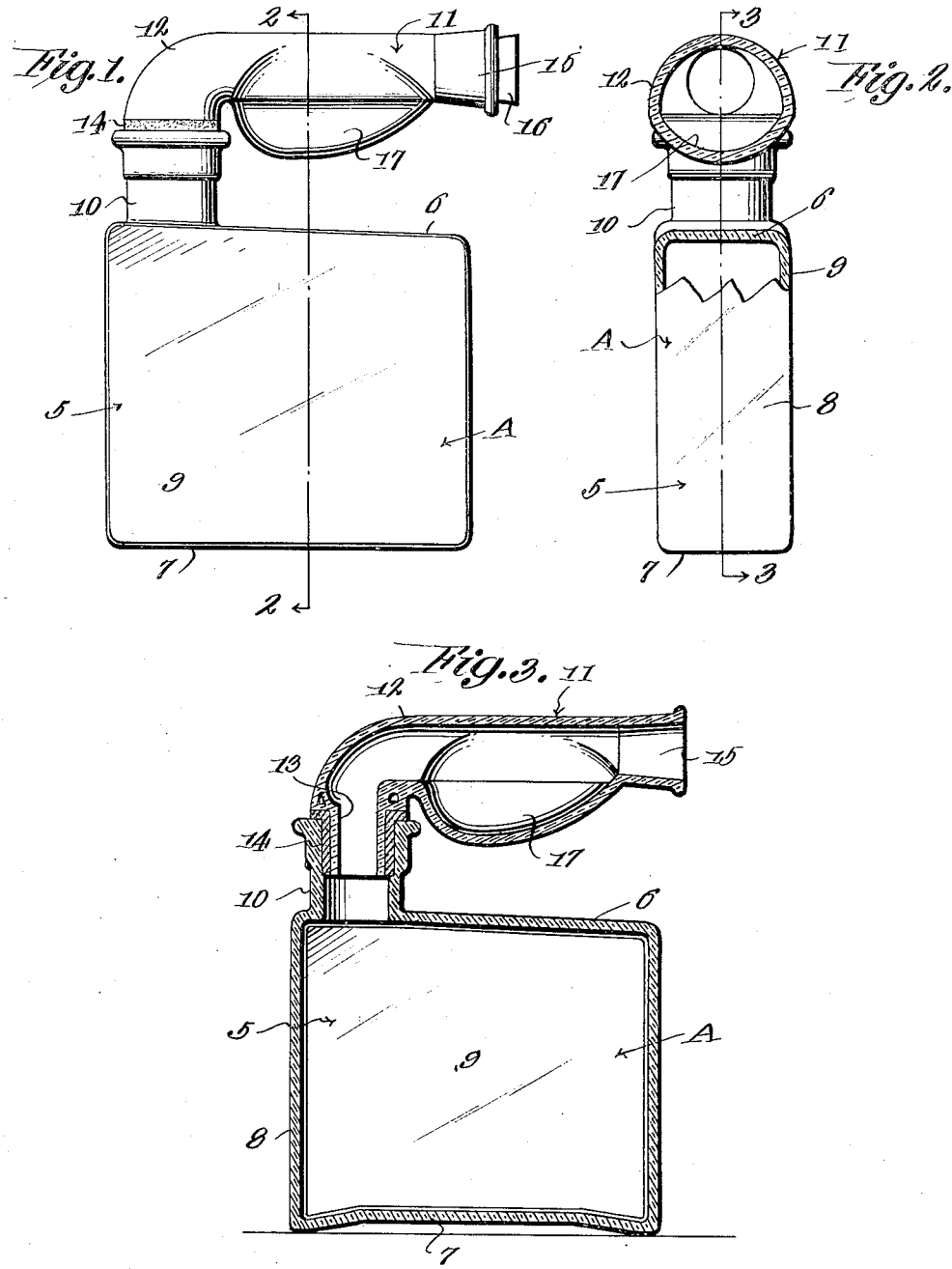

1,748,191

UNITED STATES PATENT OFFICE

JIMMY N. ROOS, OF NEW ORLEANS, LOUISIANA

DRY AND LIQUID MEASURING DEVICE, CONTAINER, AND DISPENSER

Application filed March 30, 1929. Serial No. 351,358.

This invention appertains to measuring bottles or containers and has for one of its primary objects the provision of a bottle or container having an extension neck provided with a measuring well of predetermined capacity, so arranged that the material in the container or body will be permitted to readily flow into the extension neck and well from the body so that a measured quantity can be had without the use of a spoon or other extraneous measuring device.

A further important object of my invention is the provision of novel means for arranging the extension neck relative to the body of the container, the extension neck being disposed directly over the body of the container and in a horizontal plane whereby the level of the measured material in the measuring well in the extension neck will be substantially parallel to the material in the body of the container when the container is placed on its bottom wall and after the material has been allowed to flow into said measuring well, whereby danger of accidentally spilling the material from the container and the measuring well is eliminated.

A further object of my invention is the provision of means for associating the extension neck with the container whereby the same can be freely removed from the body of the container for any purpose, such as when it is desired to pour the measured quantity of material from the extension neck without disturbing the container itself.

A still further object of my invention is to provide a measuring bottle of the above character, which will be durable and efficent in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:—

Figure 1 is a side elevation of my improved measuring bottle.

Figure 2 is a vertical section taken on the line 2—2 of Figure 1 looking in the direction of the arrows illustrating the measuring well of the extension neck, part of the body of the container or bottle being shown in side elevation, and Figure 3 is a vertical section through the improved measuring bottle taken on the line 3—3 of Figure 2 looking in the direction of the arrows at right angles to Figure 2.

Referring to the drawings in detail, wherein similar reference characters designate corresponding parts throughout the several views, the letter A generally indicates my improved measuring bottle or container, which comprises the hollow body 5 formed of glass or similar material. This body 5 may comprise a top wall 6, a bottom wall 7, end walls 8 and side walls 9. The top wall 6 adjacent to one end wall 8 is provided with a vertical outlet neck 10, which may be formed integral with the top wall 6.

In accordance with my invention I provide an extension neck 11, which likewise can be made of glass or any preferred material. This extension neck 11 can be formed integral with the vertical neck 10 but I prefer to make this extension neck 11 removable and separable from the vertical neck 10, as shown in the drawings.

The extension neck 11 includes a substantially horizontal portion 12 and a depending reduced nipple 13, which is formed on one end of said horizontal portion. The nipple 13 is insertable within the vertical neck 10 and a suitable packing 14 can be placed between the nipple 13 and the neck 10 so as to insure a proper and fluid-tight connection between said nipple and vertical neck. As clearly shown in the drawing, the extension neck extends over the body 5 of the bottle or container and the end of the horizontal portion 12 of the extension neck 11 is provided with an outlet 15 which preferably extends a slight distance beyond the end wall 8 opposite to the end wall to which the vertical neck 10 is adjacent. The outlet 15 of the extension neck is adapted to receive a suitable cork or other closure 16 to permit the sealing of the extension neck and container.

The lower wall of the horizontal portion 12 of the extension neck 11 between the nipple 13 and the outlet 15 is provided with a depressed measuring well 17 of predetermined capacity and this well can be in the shape of the bowl of a spoon, if so desired. The measuring well 17 can be of a size to hold exactly one spoonful of material, if desired, but it is to be understood that the well can be made larger or smaller for measuring greater or less quantities of material.

Due to the fact that the extension neck is arranged in a horizontal plane and directly over the body portion 5 of the container A, the level of the measured material in the well 17 will be substantially parallel to the level of the material in the body portion 5 of the container or bottle when the bottle or container is placed upon its bottom wall 7 so that the bottle or container and the measured material will be at all times in a stable condition. It is to be further noted that the outlet 15 of the extension neck is above the well 17 so that spilling of the measured quantity of material in the well 17 will be prevented upon the withdrawal of the stopper or cork 16.

In use of my improved bottle or container, when it is desired to obtain a measured quantity of material from the body of the container, the bottle with its cork 16 in place is tilted or canted on its side and the material is allowed to flow from the body 5 into the extension neck 11 and into the well 17, after which the body is again turned to an upright position and excess material within the extension neck will flow back into the body of the container 5 leaving a measured quantity thereof in the well 17. The stopper 16 can now be removed and the body 5 again tilted allowing the measured quantity of material in the well 17 to flow out of the outlet 15 which can be accomplished without pouring any of the material in the body 5 of the container again into the extension neck. If desired, after the measured quantity of material is received within the well 17 the extension neck 11 can be removed from the vertical neck 10 in order to permit the free pouring of the measured quantity of material from the well 17 out of the outlet 15.

Changes in details may be made without departing from the spirit or the scope of this invention, but:—

What I claim as new is:—

1. A measuring bottle comprising a body having a top wall, a bottom wall, side and end walls, a vertically disposed outlet neck on the top wall adjacent to one end wall, an extension neck communicating with the outlet neck having an outlet adjacent to the opposite end wall, and a depressed measuring well formed in the bottom wall of the extension neck directly over said body, the outlet of the extension neck being in a plane above the measuring well, said extension neck being arranged in a horizontal plane directly above the top wall of the body, whereby the level of the measured material in the well will be substantially parallel to the level of the material in the body, when the body is resting on its bottom wall.

2. A measuring bottle comprising a body having a top wall, a bottom wall, side and end walls, a vertically disposed outlet neck on the top wall adjacent to one end wall, an extension neck communicating with the outlet neck having an outlet adjacent to the opposite end wall, and a depressed measuring well formed in the bottom wall of the extension neck directly over said body, the outlet of the extension neck being arranged in a horizontal plane directly above the top wall of the body, whereby the level of the measured material in the well will be substantially parallel to the level of the material in the body, when the body is rested on its bottom wall, said extension neck being freely removable from the vertical neck, whereby the measured material can be readily poured from the well when desired without disturbing the body.

JIMMY N. ROOS.